United States Patent [19]

Halligan

[11] Patent Number: 5,103,205
[45] Date of Patent: Apr. 7, 1992

[54] TRAFFIC WARNING AND DIRECTIONAL INFORMATION APPARATUS

[76] Inventor: Robert C. Halligan, 36 Glennalittle Trail, Huntington, N.Y. 11743

[21] Appl. No.: 546,367

[22] Filed: Jun. 29, 1990

[51] Int. Cl.⁵ .............................................. B60Q 7/00
[52] U.S. Cl. ................................... 340/473; 340/908; 116/48; 40/591
[58] Field of Search ............... 340/473, 472, 490, 468, 340/908, 908.1, 475; 116/46–49, 28 R, 63 P; 40/550, 591, 592, 610

[56] References Cited

U.S. PATENT DOCUMENTS

| | | | |
|---|---|---|---|
| 1,431,932 | 10/1922 | Carey | 116/48 |
| 1,732,603 | 10/1929 | Hoffman | 116/48 |
| 2,669,705 | 2/1954 | Collins | 340/908 |
| 3,296,998 | 1/1967 | Kirk | 116/28 R |
| 3,518,624 | 6/1970 | Smith, Jr. | 340/475 |
| 3,531,634 | 10/1970 | Plouch | 116/28 R X |
| 3,936,967 | 2/1976 | Davis | 40/592 |
| 4,197,808 | 4/1980 | Kinninger | 116/636 |
| 4,631,516 | 12/1986 | Clinker | 340/472 X |
| 4,633,215 | 12/1986 | Anders et al. | 116/28 R X |

Primary Examiner—Jin F. Ng
Assistant Examiner—Brian R. Tumm
Attorney, Agent, or Firm—William B. Ritchie

[57] ABSTRACT

A traffic warning apparatus for mounting on the trunk of vehicle. The apparatus features an arrow that can be easily changed to point left or right and is visible over substantial distances. The apparatus which is stored conveniently inside the trunk when not in use can be quickly set up without the use of tools. The apparatus makes use of the vehicle warning flashing circuits to enable the arrow and caution indicia to flash thereby increasing the warning to the approaching vehicles.

14 Claims, 5 Drawing Sheets

TRAFFIC WARNING AND DIRECTIONAL INFORMATION APPARATUS

BACKGROUND OF THE INVENTION

1. Field of the Invention

The invention relates to emergency traffic signalling devices.

2. Description of the Related Art

Traffic accidents, breakdowns, road repairs and other impediments to traffic flow often cause other traffic accidents due to the unexpected obstruction of normal traffic flow. Oncoming traffic without sufficient notice of an obstacle in their lane of travel must make rapid changes in lanes or quick stops to avoid collisions. Accident victims, emergency personnel, road crews, and drivers or passengers attempting to attend to a broken down vehicle face a substantial likelihood of being hit, especially on high speed highways. The number of people who have been hit by a car while routinely changing a flat tire, even when well off on the shoulder of the road, is alarming.

In order to safely alert oncoming traffic to the impending danger, it is essential to provide a warning that enables approaching drivers to be alerted: 1.) to the obstruction in sufficient time to stop or slow down; 2.) to be directed to a traffic lane which enables them to safely bypass the hazard.

In the case where the obstruction to traffic is planned, for example, road repair, provisions can be made to provide adequate warning and rerouting for approaching motorists. U.S. Pat. No. U.S. Pat. No. 3,883,846, issued to Bruner on May 13, 1975, discloses a trailer that may be towed into position for traffic direction control of high speed traffic.

Another trailer device is disclosed in U.S. Pat. No. 3,622,980, issued to Elledge on Aug. 5, 1968. Both devices, however, are not practical for alerting motorists when the obstruction to traffic occurs at random and suddenly, i.e., automobile breakdowns, falling trees or rock and, of course, the most common problem . . . vehicular accidents.

In these situations, emergency personnel have customarily chosen the use of road flares to warn traffic about the present danger. All state police who are often the first trained personnel to arrive at such events are so equipped. Additionally, many prudent motorists recognize the wisdom for carrying such devices. While flares can be spotted at substantial line of sight distances, being so low to the ground restricts effectiveness to roads which are reasonably level or sloping down toward the scene of the obstruction. Roads where the scene of an accident or breakdown is at an up hill grade to approaching traffic or with one or more intervening moderate rolling hills can obstruct the flare from being seen. Further, flares are not able to indicate a selected direction on which to pass the obstruction ahead. Also, the flares must be continually be replaced as their life span is measured in minutes.

A number of devices have been proposed to solve this problem. U.S. Pat. No. 4,825,191, to Ching-Hwei, discloses a straight alignment of three segments, or the formation of a triangular device by bending two of the segments to fasten together. During emergency use, the device flashes but does not indicate directional information.

U.S. Pat. No. 4,835,515, issued to McDermott on May 30, 1989, discloses an automobile roof mounted frame that is permanently attached. During use, the arms of the frame are raised to provide warning and directional information through a lighted arrow formed by the bars of the frame. While this device provides the necessary information, it is impractical because of the requirement for permanent placement on the roof of the car and its considerable size and complexity. It cannot be used on police cars as it will interfere with standard police car lighting systems. Use of this device will significantly increase gasoline consumption due to the extra drag of the device.

U.S. Pat. No. 4,152,854, issued to Berry on May 8, 1979, discloses another roof mounted warning apparatus. This design is also permanently mounted using a folding configuration to reduce drag while the vehicle is moving. Due to its size, the mounting required to hold the device while moving must be substantial and there will still be an increase in drag such as found with even relatively streamline roof racks.

U.S. Pat. No. 3,188,608, issued to Clarke on Jun. 8, 1965, discloses a permanent roof mounted separate left and right arrow turn indicators. U.S. Pat. No. 3,761,890, issued to Fritts on Sept. 25, 1973, discloses a similar roof mounted rack that raises to indicate direction and other messages. These devices have the same difficulties of other permanent roof mounted devices.

U.S. Pat. Nos. 4,574,269; 4,374,376; and 4,833,443 disclose other traffic warning devices and are of general interest to the invention.

While other devices have featured both warning and directional information, none meet the requirements of being storable inside the automobile when not in use; do not interfere with the standard roof mounted police car lights; and can be setup conveniently in a matter of seconds when needed; and are capable of warning motorists at considerable distances and indicate which way the hazard can be safely passed.

SUMMARY OF THE INVENTION

It is an object of the present invention to be readily transportable in a vehicle when not in use, preferably the trunk of the automobile.

It is another object of this invention to provide warning on road hazards at sufficient distances to permit traffic to safely slow or stop.

It is a further object of this invention to be mountable on a trunk of a standard automobile or other type of vehicles.

It is yet another object of this invention to be able to indicate a preferred traffic flow direction to oncoming motorists at sufficient distances to permit driving around road hazards safely.

It is an still another object of the invention to provide a road hazard warning device that may be setup quickly and conveniently as needed.

The invention is an apparatus for emergency traffic control that is transportable in a vehicle. Directional indicator means is provided for indicating to the oncoming motorist a preferred traffic flow direction around said automobile. Warning post support means, attached to directional indicator means, supports and provides an electrical current to said directional indicator means. Trunk mounting means, adapted to be permanently mounted to the trunk of said automobile, is provided for attaching said warning post support means releasably to the vehicle and for providing an electrical connection from the hazard warning light circuitry in the vehicle to said directional indicator means via said warning post means.

DETAILED DESCRIPTION OF THE INVENTION

Figure 1:
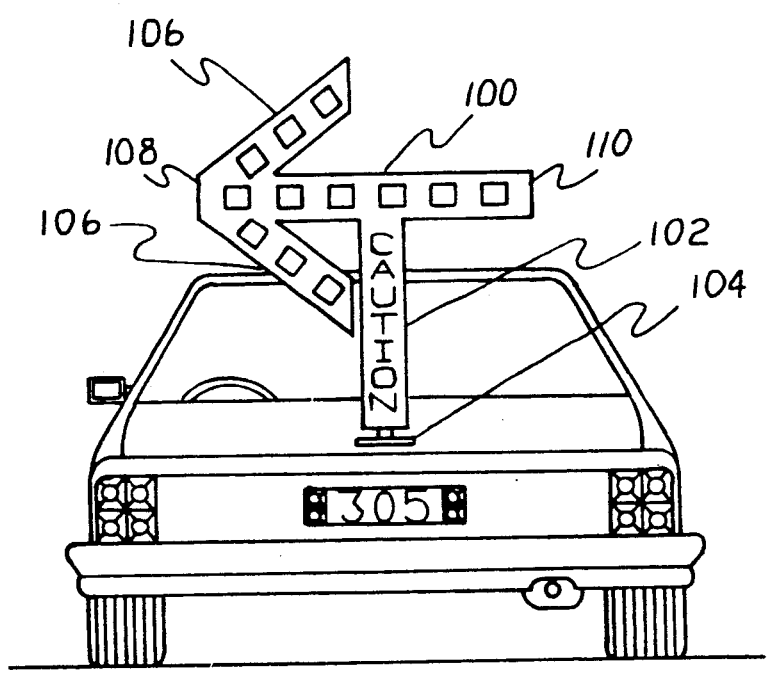
FIG. 1 illustrates a standard automobile equipped with a traffic warning and directional information apparatus according to the invention.

FIG. 1 illustrates a standard automobile equipped with a traffic warning and directional information apparatus according to the invention. Arrow 100 is shown in the left pass position mounted on the trunk of a standard automobile. Preferably arrow 100 is 42 inches long, 4" wide and 1.5" inches deep. While a variety of materials could be used to construct arrow 100, it is preferably fabricated from high impact plastic. Arrow head arms 106 extend backward from the point 108 preferably 24 inches and 12 inches from the arrow head shaft 110.

Figure 5:
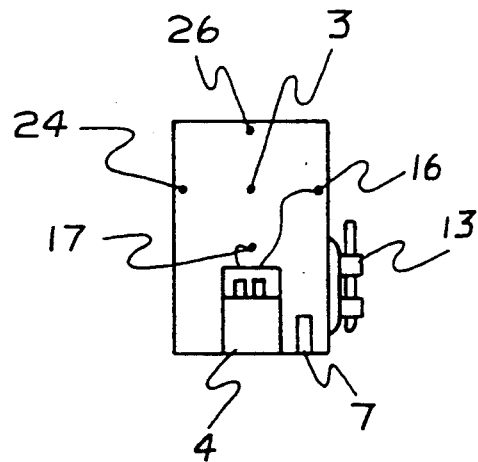
FIG. 5 illustrates a cutaway front view of the directional locking member according to the invention.

Arrow 100 is attached to warning post support 102 utilizing directional locking member 112 (shown in FIG. 5). Warning post support 102 is preferably 25 inches in length, 4" wide and 1.5 inches deep, again fabricated from high impact plastic. Warning post support 102 is attached to the automobile by trunk mount 104. Trunk mount 104 is permanently mounted to the automobile.

When not in use, locking member 112 permanently attached to arrow 100 is detached from post support 102 so that the entire unit can fit inside the trunk of the automobile. In an alternative embodiment, arms 106 could also be adapted to be taken apart (where indicated in FIG. 4 at dotted lines 130) as the other components so that the entire unit can fit into box of dimension approximately 42 inches long, 4 inches wide and 6 inches high. Arms 106, in another alternative embodiment, could be hinged to arrowhead shaft 110 (again where indicated in FIG. 4 at dotted lines 130) and folded to again achieve a small profile that is easily stored.

Figure 2:
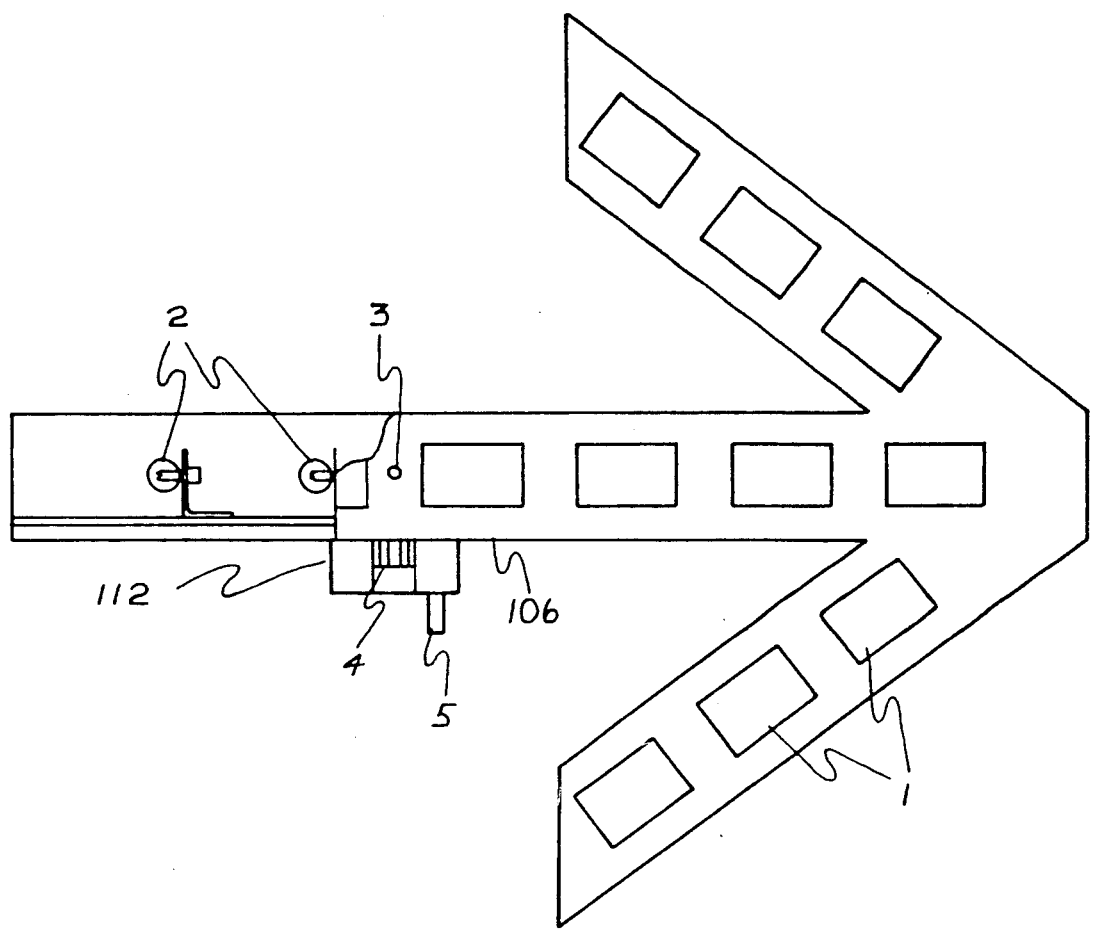
FIG. 2 illustrates a cutaway front detail view of the traffic directional indicator according to the invention.

FIG. 2 illustrates a cutaway front view detail of the traffic directional indicator according to the invention. Red reflector lenses 1 are located on the arrowhead shaft 110. The dimensions of these reflector lenses are not critical but are preferably 3 inches long and 2 inches wide so that arrow 100 can be seen from substantial distances. Each lens is illuminated by 12 volt lamps 2. Each lamp 2 is hooked in parallel to one another so that if one lamp should burn out, the remainder will remain lit. Lamps 2 will be tied into the hazard flasher in the car so that arrow 100 will flash continually while in use. In an alternative embodiment, lamps 2 can be set to flash in sequence to emphasize the direction in which to turn.

Locking member 112 is shown attached to the rear of arrow 100 by means of center rotating bolt 3. Bolt 3 is preferably ¼" by 4¼" zinc plated steel.

Locking pin slide bolt 13 is a preferably a zinc plated 2" by 2" stock slide bolt with a ¼" slide pin of the type used to secure doors, windows, etc. As arrow 100 is turned to the right or left, bolt 13 is inserted into locking pin receiver 12 to hold arrow 100 in a right or left position (shown in FIG. 4). Rotation of locking member 112 is around permanently mounted bolt 3.

Female electric socket 4 is shown recessed into locking member 112 which protects the electric connection from the weather. Male alignment 5 is used to line up socket 4 and male electric socket 6. The sockets hard rubber ⅝" in diameter, 1" long, of the type manufactured by Attwood Corporation, Lowell, Mich.

Figure 3:
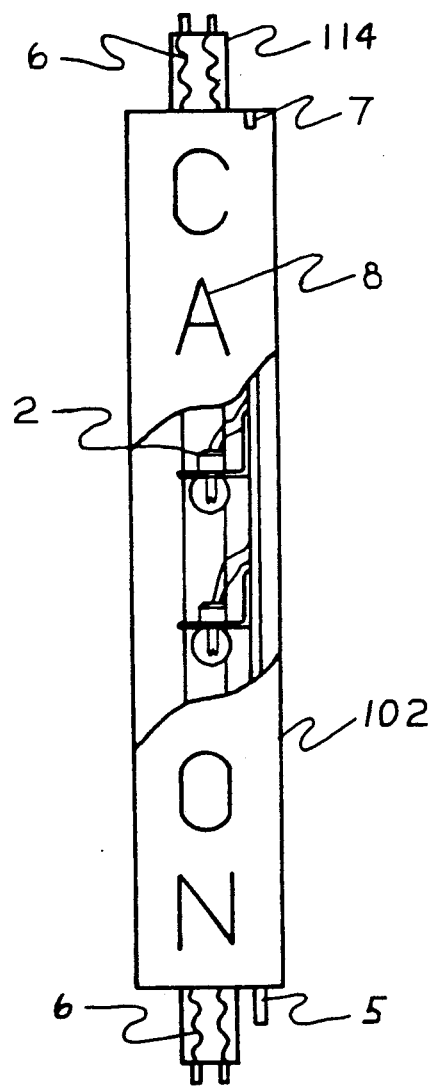
FIG. 3 illustrates a cutaway front view of the warning post support means according to the invention.

FIG. 3 illustrates a cutaway front view of the warning post support 102 according to the invention. Tubing 114 extends through support 102 which helps anchor support 102 to locking member 112 and trunk mount 104. Tubing 114 is preferably ⅝" ID, ¾" OD of rigid chrome plated copper. Sockets 4 and 6 are permanently mounted in their respective tubes. Top socket 6 attaches to locking member 112 and lower socket 6 attaches to trunk mount 104.

On the surface of support 102 are reflective letters 8 which are manufactured from translucent light reflecting material. The indicia as shown spells the word "caution", however, other indicia such as "warning", "slow" could also be used. Letters are 2½' long and 1¾" wide.

Alignment pin receivers 7 are designed to mate with alignment pins 5 to keep arrow 100 and support in position during use.

Figure 4:
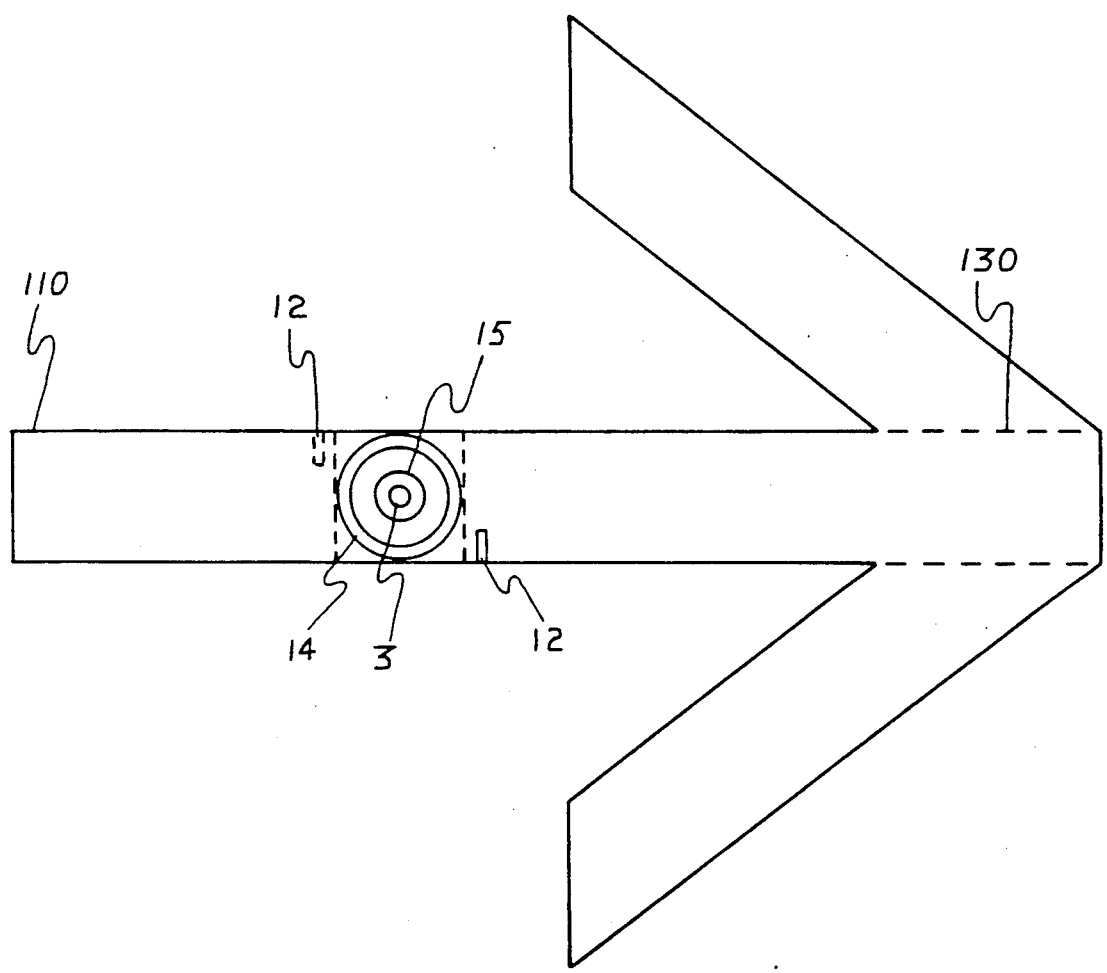
FIG. 4 illustrates a back view of the traffic directional flow indicator means according to the invention.

FIG. 4 illustrates a back view of the traffic directional flow indicator according to the invention. Electrical connection of lamps 2 is made through positive electrode ring 14 and negative electrode ring 15. Each of the respective rings are preferably made from brass plate 1/16" thick, 4½" in diameter with the ring being ¼" wide. The inner plate is preferably 2" in diameter. Other suitable conductors such as copper or aluminum could be used as well. By providing the conductors in a ring, arrow 100 may be engaged to point either left or right, depending on the circumstances.

Locking pin receivers 12 are on both the sides of arrow head shaft 110 to lock arrow 100 to locking member 112 in combination with center rotating bolt 3.

FIG. 5 illustrates a cutaway front view of the directional locking member 112 according to the invention. Locking member 112 is preferably about 8.5 inches long, 4 inches wide, and 1.5 inches deep. Locking member 112 permits arrow 100 to be pointing in either direction. Electricity is brought in locking member 112 through socket 4. Positive spring loaded contact pin 16 is a spring loaded bullet catch as used to hold small doors closed. The type manufactured by the Ferum Company, Pine Brook, N.Y. is representative. Contact pins 24 and 26 are not electrical connected and are used to balance locking member 112 so that it may turn easily. Contact pin 16 engages positive electrode ring 14 when in use. Similarly, negative spring loaded contact pin 17 engages negative electrode ring 14 when in use. Locking pin slide bolt 13 engages locking pin receiver 12 when locking member 112 is attached to arrow 100.

Figure 6:
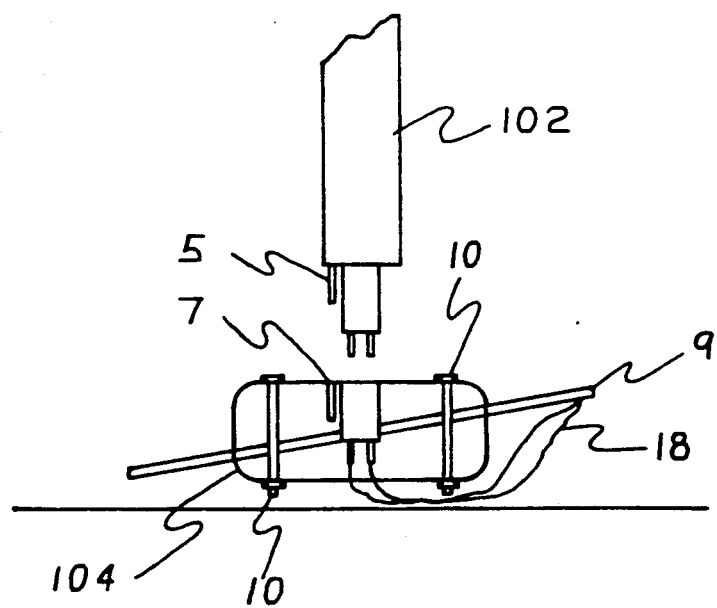
FIG. 6 illustrates an exploded view of the warning post support means and the trunk mount according to the invention.

FIG. 6 illustrates an exploded view of the warning post support and the trunk mount 104 according to the invention. Warning post support 102 is attached to trunk mount 104 electrically through male socket 6 into female socket 4, respectively. Trunk mount 104 is permanently mounted to trunk lid 9 using four bolts 10 or other comparable fasteners. Socket 4 is wired via lines 18 to the hazard light wires in the trunk, so that a continual flashing signal is in effect when the hazard light switch in the automobile is turned on.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A transportable emergency traffic control apparatus for a vehicle comprising:
   directional indicator means for indicating to the oncoming motorist a preferred traffic flow direction around said vehicle, wherein said directional indicator means further comprises an arrow with a shaft, said arrow having detachable arrow head arms;
   warning post support means, releasably attached to said directional indicator means, for supporting and for providing an electrical current to said directional indicator means;
   trunk mounting means, adapted to be permanently mounted to the trunk of said vehicle to provide a single point of attachment for releasably attaching said warning post support means in a substantially vertical position during use on said vehicle and for providing an electrical connection from the hazard warning light circuitry in said vehicle to said directional indicator means via said warning post means.

2. The transportable emergency traffic control apparatus of claim 1 wherein said directional indicator means further comprises a first illumination means.

3. The transportable emergency traffic control apparatus of claim 2 wherein said first illumination means further comprises flashing lights.

4. The transportable emergency traffic control apparatus of claim 3 wherein said warning post support means further comprises second illumination means.

5. The transportable emergency traffic control apparatus of claim 4 wherein said second illumination means further comprises flashing lights.

6. The transportable emergency traffic control apparatus of claim 1 wherein said warning post support means further comprises indicia to warn of impending road hazards.

7. A transportable emergency traffic control apparatus for a vehicle comprising:
   directional indicator means for indicating to the oncoming motorist a preferred traffic flow direction around said vehicle, wherein said indicator means further comprises an arrow with a shaft, said arrow having collapsible arrow head arms that are hinged to the shaft of the arrow;
   warning post support means, releasably attached to said directional indicator means, for supporting and for providing an electrical current to said directional indicator means;
   trunk mounting means, adapted to be permanently mounted to the trunk of said vehicle to provide a single point of attachment for releasably attaching said warning post support means in a substantially vertical position during use on said vehicle and for providing an electrical connection from the hazard warning light circuitry in said vehicle to said directional indicator means via said warning post means.

8. The transportable emergency traffic control apparatus of claim 7 wherein said directional indicator means further comprises a first illumination means.

9. The transportable emergency traffic control apparatus of claim 8 wherein said first illumination means further comprises flashing lights.

10. The transportable emergency traffic control apparatus of claim 9 wherein said warning post support means further comprises second illumination means.

11. The transportable emergency traffic control apparatus of claim 10 wherein said second illumination means further comprises flashing lights.

12. The transportable emergency traffic control apparatus of claim 7 wherein said warning post support means further comprises indicia to warn of impending road hazard.

13. A transportable emergency traffic control apparatus for a vehicle comprising:
   arrow indicator means for indicating to the oncoming motorist a preferred traffic flow direction around said vehicle, said arrow indicator means having detachable arrow head arms;
   warning post support means, attached to said arrow indicator means, for supporting and for providing an electrical current to said arrow indicator means;
   trunk mounting means, adapted to be permanently mounted to the trunk of said vehicle, for releasably attaching said warning post support means in a substantially vertical position during use on said vehicle and for providing an electrical connection from the hazard warning light circuitry in said vehicle to said arrow indicator means via said warning post means.

14. An emergency traffic control apparatus having components transportable in the trunk of a vehicle, capable of being assembled in the field at the scene of an emergency comprising:
   indicator means for indicating to the oncoming motorist a preferred traffic flow direction;
   directional locking means for easily reversing said indicator means to indicate left or right traffic flow pattern, with said directional locking means releasably attached to said indicator means;
   support means for supporting said directional locking means by releasable connectors having at least a portion of said connectors capable of conducting an electrical current;
   trunk mounting means for holding said support means firmly in a substantially vertical position atop the trunk of said vehicle at a single point of attachment.

* * * * *